United States Patent [19]
Bitzakidis et al.

[11] Patent Number: 5,912,651
[45] Date of Patent: *Jun. 15, 1999

[54] MATRIX DISPLAY SYSTEMS AND METHODS OF OPERATING SUCH SYSTEMS

[75] Inventors: Stefanos Bitzakidis, Redhill, United Kingdom; Gerard M. X. Fernando, Mountain View, Calif.

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/779,175

[22] Filed: Jan. 6, 1997

Related U.S. Application Data

[63] Continuation of application No. 08/268,760, Jun. 29, 1994, abandoned.

[30] Foreign Application Priority Data

Jun. 30, 1993 [GB] United Kingdom .................... 9313523
Jun. 30, 1993 [GB] United Kingdom .................... 9313524

[51] Int. Cl.⁶ ......................................................... G09G 3/20
[52] U.S. Cl. ............................... 345/58; 345/99; 345/208; 345/102
[58] Field of Search .................................. 345/94, 95, 99, 345/84, 208, 58, 77, 102, 88, 7

[56] References Cited

U.S. PATENT DOCUMENTS

| | | | |
|---|---|---|---|
| 4,380,008 | 4/1983 | Kawakami | 345/95 |
| 4,644,344 | 2/1987 | Larsen et al. | 345/105 |
| 4,907,862 | 3/1990 | Suntola | 350/345 |
| 4,915,477 | 4/1990 | Ohta | 345/94 |
| 4,958,915 | 9/1990 | Okada | 345/102 |
| 5,122,791 | 6/1992 | Gibbons | 345/102 |
| 5,155,613 | 10/1992 | Sakayori | 345/97 |
| 5,248,965 | 9/1993 | Yoshimitsu | 345/94 |
| 5,296,953 | 3/1994 | Kanbe et al. | 345/87 |

FOREIGN PATENT DOCUMENTS

| | | |
|---|---|---|
| 0241562 | 10/1987 | European Pat. Off. . |
| 0261893A2 | 3/1988 | European Pat. Off. . |
| 0261896 | 3/1988 | European Pat. Off. . |
| 0487140 | 5/1992 | European Pat. Off. . |
| 0487140A1 | 5/1992 | European Pat. Off. . |

*Primary Examiner*—Richard A. Hjerpe
*Assistant Examiner*—Kent Chang
*Attorney, Agent, or Firm*—John C. Fox

[57] ABSTRACT

A matrix display system, comprising a display panel (10) having a row and column array of light modulating picture elements (12), for example liquid crystal picture elements, and panel illuminating means (19), is operated by driving the rows of picture elements such that the display information of successive fields of an applied video signal is written into the panel in respective panel display information address periods that are substantially less than the applied video signal field period and separated by a time interval, and such that successive periods in which display fields are presented to a viewer are separated by intervals in which substantially no display output is produced. The resulting dark intervals lead to an improvement in perceived resolution of moving images. The illumination means can be controlled so as to produce a display output during at least a part of the interval and substantially no display output during at least a part of the address period. Alternatively, the picture elements can be driven to their substantially non-transmissive display states during the interval between successive display information address periods and the illumination means may be turned off for a part of that interval.

31 Claims, 4 Drawing Sheets

MATRIX DISPLAY SYSTEMS AND METHODS OF OPERATING SUCH SYSTEMS

This is a continuation of application Ser. No. 08/268,760, filed Jun. 29, 1994, now abandoned.

BACKGROUND OF THE INVENTION

The invention relates to matrix display systems, particularly video display systems, for example, for displaying TV pictures, and methods of operating such systems.

The invention concerns matrix display systems, for example, liquid crystal display systems, of the kind comprising a display panel having a row and column array of picture elements for modulating light, means for illuminating the display panel, and drive means for driving the picture elements in accordance with an applied video signal, the picture elements being driven a row at a time by scanning the rows in sequence repetitively in respective field periods.

Video display systems comprising display panels having light modulating picture elements, such as liquid crystal elements, for displaying TV pictures and the like are well known. Larger area display panels commonly include an active switching device, for example a TFT or thin film diode, associated with each picture element to improve display quality. In operation, the display panel is continuously illuminated by a light source and the picture elements serve to modulate the light according to applied video information to produce a display output. The picture elements are connected to row and column address conductors and are driven one row at a time in sequence by scanning the row conductors with selection signals so as to transfer video information, data, signals, derived by sampling an input video signal, on the column conductors to the respective picture elements. After all rows have been addressed in one field period, the operation is repeated with each row being addressed in successive field periods. In these known systems, the scanning, and hence field, frequency is determined by timing signals of the input video signal and the field rate of the display panel corresponds to that of the supplied video signal. In the case of a PAL TV, for example, each row of picture element is addressed in a line period of 64 microseconds or in the interval between successive line periods, which occurs once every 20 milliseconds, corresponding to the field period. In the case particularly of active matrix display devices, then for the interval between successive addressing (corresponding to a field period) the picture elements are effectively isolated so that charge is stored on the picture element and the display effect produced by the picture element is substantially maintained until the element is next addressed in the subsequent field period.

The use of active matrix addressing, using for example TFTs or MIMs, and twisted nematic liquid crystal materials has enabled many of the requirements demanded for video displays, for example grey scales, contrast and brightness, to be satisfied to an extent. For acceptable viewing, the display system should be capable of providing good display quality for rapidly moving images as found in TV or computer generated graphics. There is a need for improvement in this respect, especially with regard to blurring or smearing effects which occur when displaying moving images. The effect tends to be particularly noticeable for bright objects moving against a dark background.

It has been found that the time taken for the transmission of a picture element to stabilise after a change in the drive level can be significant and in a typical display panel it may take several fields for a picture element to settle to its now transmission level when the drive level is changed from, for example, a 90% transmission to 10% transmission and with a panel being driven at a field rate of 50 Hz corresponding to the field rate of an applied video (PAL) signal. There is described in EP-A-0487140 a method of driving an active matrix liquid crystal video display device which leads to an improvement in this respect. In this method, the picture elements are driven at a field rate which is higher than that of the applied video signal. For example, in the case of the applied video signal comprising a PAL or NTSC TV broadcast signal whose field rates are 50 Hz and 60 Hz respectively, the field rate for the display panel may be increased to 100 Hz and 120 Hz respectively. This has been found to reduce significantly the time taken for the transmission of a picture element to stabilise after a change in the drive (video) level.

Whilst this approach provides a significant improvement with regard to smearing effects, it has been found that certain unwanted visual effects in the form of a perceived lack of sharpness or blurring, particularly at the edge of moving objects, can still occur.

It is an object of the present invention to provide a matrix display system which offers improved display quality when displaying moving images and a method of operating a matrix display system which helps to alleviate the problem of unwanted visual effects when displaying moving images.

OBJECTS AND SUMMARY INVENTION

According to one aspect of the present invention there is provided a matrix display system comprising a display panel having a row and column array of picture elements for modulating light which are drivable to at least substantially transmissive and substantially non-transmissive states, means for illuminating the display panel to produce a display output, and drive means for driving the picture elements according to a video signal having a given field and line rate applied to the drive means, the drive means being operable to drive the rows of picture elements sequentially such that the display information of a display field of the applied video signal is written into the display panel in a display information address period that is substantially less than the field period of the video signal, and with successive display information address periods being separated by a time interval, which is characterised in that the display system is operable such that successive periods in which to a viewer display fields other display panel are presented are separated by time periods in which substantially no display output is produced.

According to another aspect of the present invention there is provided a method of operating a matrix display system comprising a display panel having a row and column array of picture elements for modulating light which are drivable to at least substantially transmissive and substantially non-transmissive states, means for illuminating the display panel to produce a display output, and drive means for driving the picture elements according to a video signal having a given field and line rate applied to the drive means, in which method the rows of picture elements are sequentially driven such that the display information of a display field of the applied video signal is written into the display panel in a display information address period that is substantially less than the field period of the video signal, and in which successive display information address periods are separated by a time interval, which is characterised in that successive periods in which display fields of the display panel are presented to a viewer are separated by time periods in which substantially no display output is produced.

With the invention the extent of blurring or lack of detail perceived when displaying moving images is significantly reduced. It has been determined that blurring effects are due in part to psycho-visual criteria as well as physical response characteristics of the picture elements. With a display system operating according to the invention "dark" intervals are introduced between the presentation to a viewer of successive display fields of the panel which leads to an improvement in the perceived resolution of moving images. This is because certain psycho-visual criteria on apparent motion perception are then better satisfied. Apparent motion can only be perceived when a number of parameters are within certain limits. In particular it has been established that the pause resulting from the dark interval between successive presentations of a moving image is of significant importance. In a conventional drive scheme in which the display fields correspond in duration to the field periods of the applied video signal there is no pause interval. The display picture in effect is held for the field period and this is interpreted by the human visual system as blur when moving objects are involved. The manner in which a display picture is provided by the present invention is closer to the real world situation and resembles that of a CRT. In a CRT, a pixel is addressed once every field period leading to light emission as a series of short high-intensity pulses. The duration of these pulse emissions is very small compared with the display field period so that a significant pause interval exists between successive emissions. This factor allows motion to be perceived by the eye very effectively in the CRT display picture. The difference in the temporal behaviour of a conventionally driven crystal display panel due to the sample and hold nature of the operation of the picture elements affects the ease with which the eye is able to perceive a series of slightly different stationary images as a moving scene. Through the present invention, motion perception is much improved with the blurred appearance of the edges of moving objects in the display picture being substantially reduced.

Preferably, the duration of a display information address period and an interval together correspond to a field period of the applied video signal.

For simplicity and convenience, the address period and interval may each be of a duration corresponding approximately to one half of a field period of the video signal. Possibly, two successive display information address periods and two intervals could correspond in duration to a single field period of the video signal with, in effect, the same display field being presented twice in succession by the display panel in a video signal field period. The combination of an address period and an interval could perhaps be longer than a video signal field period. For example, the interval could be chosen such that the combination of an address period and interval occupies two field periods with the display panel displaying alternate display fields of the video signal, thus enabling less complex drive circuitry to be used.

In a first preferred embodiment of a matrix display system according to the present invention, the drive circuit includes a control circuit connected to the illuminating means for controlling the light output of the illuminating means such that a display output is produced from the display panel for at least a part of the time interval and substantially no display output is produced during at least a part of the display information address period.

In a first preferred embodiment of a method of operating a matrix display system according to the present invention, operation of the illuminating means to illuminate the display panel is controlled such that a display output is produced during at least a part of said time intervals and such that substantially no display output is produced during at least a part of said address periods.

In these first embodiments, the illumination of the panel periodically, e.g. by flashing a light source on and off, introduces the aforementioned "dark" intervals between the presentation to a viewer of successive display fields of the panel, thus providing the improvement in the perceived resolution of moving images.

The display panel can be left dormant during the interval, that is, the picture elements are not addressed. Alternatively, however, the display panel may be re-addressed by applying again in this interval the same display information as used in the preceding address period in a manner similar to that described in EP-A-0487140 and with similar advantageous effect.

The display panel may be illuminated, for example by flashing on the light source, for the duration of the interval, although, preferably, it is illuminated for a latter part only of this period so as to increase the pause interval between successive display presentations from the panel and also to allow time for the picture elements to settle to their transmission level following their driving in the address period in the case where the panel is not driven again in the interval.

The panel may be illuminated only during the intervals so that illumination does not coincide with the writing of fresh display information to the display panel. In the case of the display panel being driven again in the intervals, the display information is identical with that applied in the preceding address period and so the state of the picture elements is not altered to any significant extent. Possibly the illumination period may extend into an initial part of the succeeding display information address period.

In a second preferred embodiment of a matrix display system according to the present invention, the drive circuit is operable in the time intervals between successive display information address periods to drive the picture elements of the array to their substantially non-transmissive display states.

In a second preferred embodiment of a method according to the present invention, in the time interval between successive display information address periods the picture elements of the array are driven to their substantially non-transmissive display states.

In this second embodiment, the driving of the picture elements to their substantially non-transmissive, i.e. black, states in intervals between successive display information address periods introduces the aforementioned "dark" intervals between the presentation to a viewer of successive display fields, thereby resulting in the improvement to the perceived resolution of moving images.

The display panel may be continuously illuminated during operation. Preferably, however, the illumination means is switched off, or at least to a comparatively low light output level, for a part of the interval. The darkness of the aforementioned dark intervals is then enhanced with improved contrast being obtained. The display panel may be illuminated for the duration of the address periods, although, desirably, the illumination means is switched off or at least to a low level for a period comprising the latter part of the interval and an initial part of the following address period, with illumination of the panel thus restricted to a latter part of the address period and an initial part of the interval, so as to increase further the effective pause interval between successive display presentations from the panel. The intermittent illumination of the panel can be achieved by flashing on and off the light source providing the illumination in synchronism with the driving of the panel. Consequently, the display system is operated in an energy-efficient manner with the light from the light source being used to produce a display output only when required, unlike, for example, a situation in which the panel is continuously illuminated in which the light from the light source is not used for display purposes during dark intervals. This is a particularly important advantage in a liquid crystal display system in which the light source is the most significant component in terms of power consumption.

During the interval, the rows of picture elements of the array are preferably driven in sequence to their substantially non-transmissive states, either individually, row by row, in similar fashion to that used for addressing the picture elements with display information, or perhaps in groups of rows. The former scheme is considered to be more convenient as it enables the same scan drive circuitry to be used for driving the picture elements in both the address periods and the intervals. The driving of the first row of picture elements may coincide substantially with the beginning of the interval, or alternatively, may commence after a predetermined delay time after the beginning of the interval. In the latter case, the switching of the illuminating means to its off or low level state may substantially coincide with the end of the delay time. This delay time constitutes a short dormant period after all the rows of picture elements have been addressed with the required display information during which a panel is illuminated and a display output provided according to that display information before the rows are then driven "black".

It is envisaged that an alternative scheme may be used in the intervals for driving the picture elements to their non-transmissive states, for example, a scheme in which the picture elements in the array are set to this state substantially simultaneously. Such a scheme would, however, require significant modifications to the drive circuitry.

In both these preferred embodiments, the duration of an address period and a succeeding interval together preferably correspond substantially to a field period of the applied video signal. The address period and interval may each be of a duration corresponding approximately to one half of a field period of the video signal for convenience and simplicity. Possibly, however, two successive address periods and two intervals could correspond in duration to a single field period of the video signal with, in effect, the same display field being presented twice in succession by the display panel in a video signal field period. Alternatively, the combination of an address period and an interval could be longer than a video signal field period. For example, the interval could be chosen such that the combination of an address period and interval occupies two field periods with the display panel displaying alternate display fields of the video signal thus enabling less complex drive circuitry to be used.

The invention is particularly beneficial when applied to an active matrix addressed liquid crystal display system, although it is envisaged that it can be applied to advantageous effect also to some passive matrix liquid crystal display systems. The method is also applicable, however, to matrix display systems using other kinds of light modulating display panels whose picture elements similarly hold display information for a display field.

BRIEF DESCRIPTION OF THE DRAWING

Matrix display systems, and in particular liquid crystal video display systems, and their methods of operation in accordance with the present invention will now be described, by way of example, with reference to the accompanying drawings, in which.

The same reference numerals are used throughout the Figures to indicate the same or similar parts.

The first and second embodiments of display systems are similar in a number of respects with many of their components being the same and their operations sharing, to an extent, many similarities. Consequently, the following general description is applicable to both embodiments.

DESCRIPTION OF THE PREFERRED EMBODIMENTS

Figure 1:
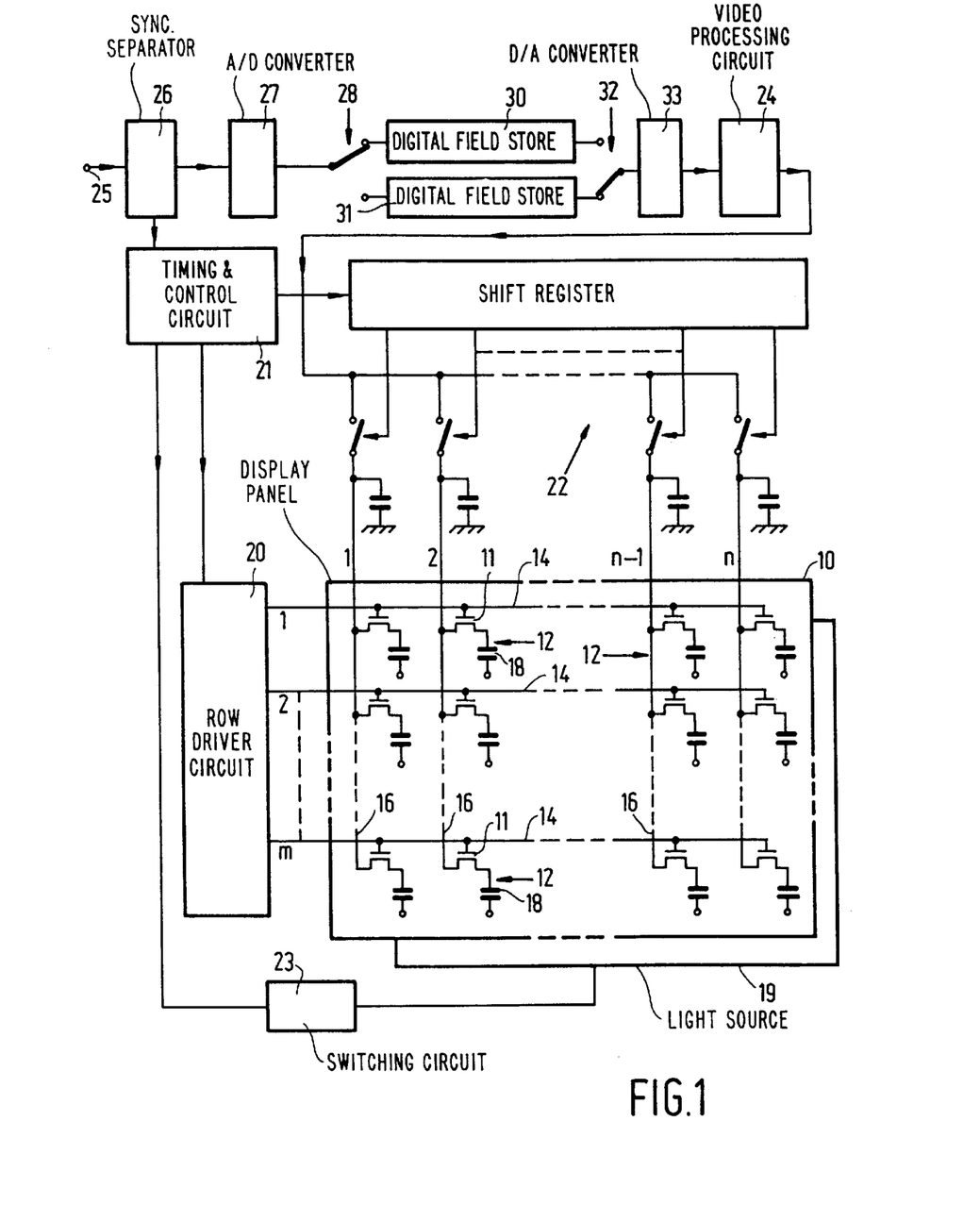
FIG. 1 is a schematic circuit diagram of a first embodiment of an active matrix addressed liquid crystal display system operable according to the invention.
Figure 2:
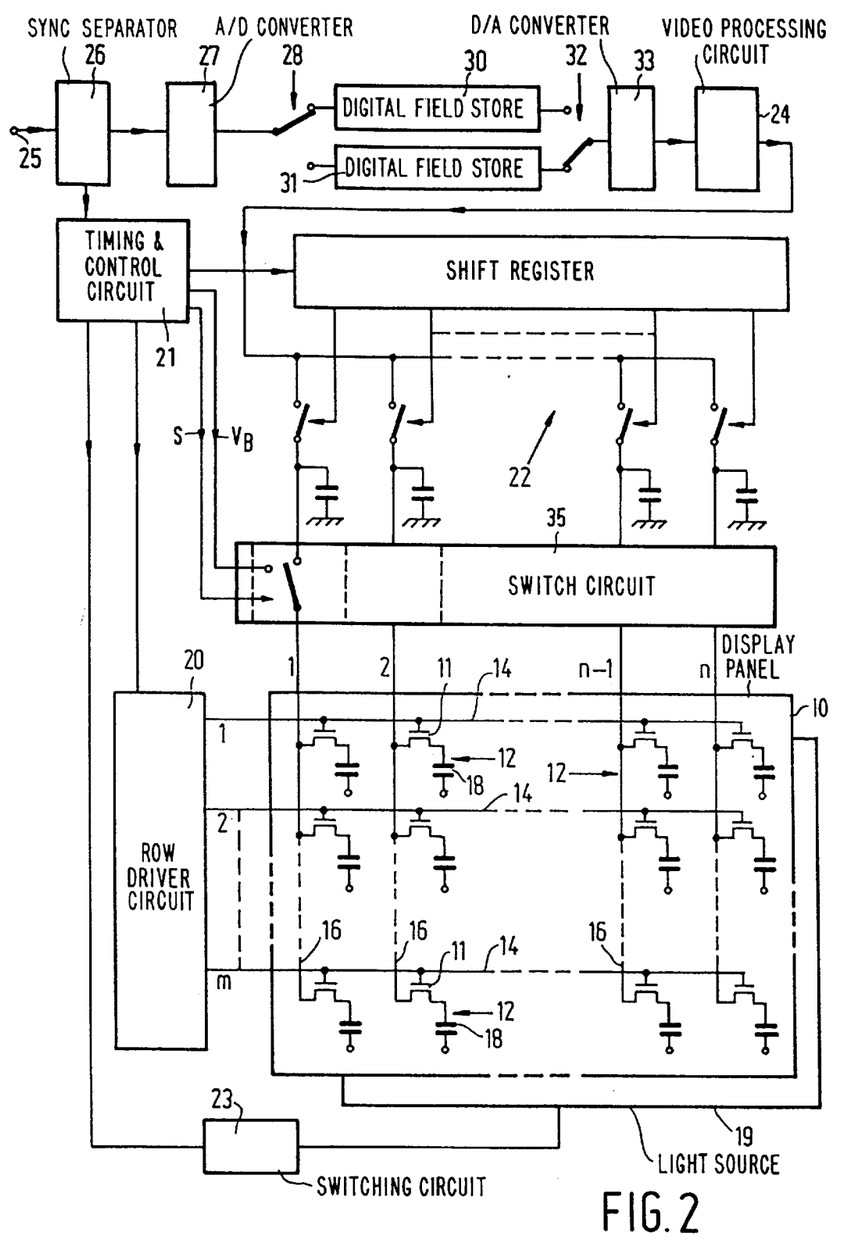
FIG. 2 is a schematic circuit diagram of a second embodiment of an active matrix addressed liquid crystal display system operable according to the invention.

Referring to FIGS. 1 and 2, the display systems, which are intended for displaying video, for example TV, pictures, each comprise an active matrix addressed liquid crystal display panel 10 having a row and column array of picture elements which consists of m rows with n horizontal arranged picture elements 12 in each row.

The display panel 10 comprises a conventional TFT type panel in which each picture element, 12, is associated with a respective TFT11 acting as a switching device and is located adjacent a respective intersection of sets of row and column address conductors 14 and 16. The gate terminals of all TFTs 11 associated with picture elements in the same row are connected to a common row conductor 14 to which, in operation, selection (gating) signals are supplied. Likewise, the source terminals associated with all picture elements in the same column are connected to a common column conductor 16 to which data (video information) signals are applied. The drain terminals of the TFTs are each connected to a respective transparent picture element electrode 18 forming part of, and defining, a picture element. The row and column conductors 14 and 16, TFTs 11 and electrodes 18 are all carried on a transparent plate, for example of glass. Parallel to, and spaced from, this plate is a further transparent plate on which is formed a continuous transparent conductive layer constituting an electrode common to all the picture elements of the panel. Twisted nematic liquid crystal material is disposed between the two plates, the two plates being suitably sealed around their periphery. The opposing plates are provided with polariser layers in conventional manner.

The panel 10 could instead be of a known kind using two terminal non-linear devices such as diodes or MIMs as switching devices and in which the sets of row and column address conductors are provided on respective plates.

The display panel 10 is illuminated by a light source 19 comprising a compact low-pressure fluorescent lamp disposed on one side, and light entering the panel from the light source is duly modulated according to the transmission characteristics of the picture elements 12 to produce a visible display output at the other side of the panel. The liquid crystal material modulates light transmitted through the picture elements according to the voltage applied thereacross, with each picture element being operable to vary light transmission through the panel in accordance with a drive voltage applied across its respective electrodes. The picture elements are operable, according to the level of the applied voltage, to produce a plurality of transmission levels ranging from a substantially non-transmissive, i.e. black, level to a substantially fully transmissive, i.e. white, level. Following standard practice the panel is driven on a row at time basis by scanning the row conductors 14 sequentially with a selection signal so as to turn on each row of TFTs in turn and applying data signals to the column conductors for each row of picture elements in turn as appropriate and in synchronism with the gating signals so as to build up a complete display picture. In the case of a TV display, each row of picture elements is provided with picture information signals of a TV line. Using one row at a time addressing all TFTs 11 of the addressed row are switched on for a row address period determined by the duration of the selection signal during which the picture element capacitors are charged according to the voltage level of the video information signals on column conductors 16. Thereafter, upon termination of the selection signal, the TFTs 11 of the row are turned off, thereby isolating the picture elements from the conductors 16, and ensuring the applied charge is stored on the picture elements until they are addressed again in a subsequent field period.

The row conductors 14 are supplied successively with identical selection signals by a row driver circuit 20 comprising a digital shift register controlled by regular timing pulses from a timing and control circuit 21 to which synchronisation signals are supplied from a synchronisation separator 26. These synchronisation signals are derived from a video, e.g. TV, signal containing picture and timing information which is applied to an input 25. Video data, (picture information), signals are supplied to the column conductors 16 from a column driver circuit 22 comprising one or more shift register/sample and hold circuits. The circuit 22 is supplied with video data signals from a video processing circuit 24 and derived from the video signal applied to the input 25. Timing signals derived from synchronisation signals obtained in the synchronisation separator 26 from the timing information of the input video signal are supplied to the circuit 22 by the timing and control circuit 21 in synchronism with row scanning to provide serial to parallel conversion appropriate to the row at a time addressing of the panel 10. The circuits 20, 21, 22, 24 and 26 are of generally conventional form and as such will not be described herein in detail. A very basic form of column driver circuit 22 is shown schematically in FIGS. 1 and 2 for simplicity and it should be understood that other types of circuit may be employed as will be apparent to persons skilled in the art.

To avoid electromechanical degradation of the LC material, the polarity of the drive signals applied to the picture elements is periodically inverted, in accordance with known practice, although the means by which this is achieved is not shown in FIGS. 1 and 2 for simplicity. This polarity inversion can take place after every complete field of the display panel.

Unlike conventional drive schemes in which selection signals are applied to successive row conductors in synchronism with TV lines with each selection signal having a duration corresponding to a TV line period, T1, or less, so that, in the case for example of a half resolution PAL standard TV display having a TV line period of 64 microseconds, each row conductor is applied with a selection signal at intervals of 20 milliseconds, the display panel 10 is driven at a line rate which is greater than the line rate of the input video, TV, signal. In EP-A-0487140 a drive scheme for an active matrix LC display device is described in which the display panel is driven at a field rate higher than, for example, twice, that of an applied TV signal. In this scheme the picture elements of the display panel are loaded twice, with identical display information, in a period corresponding to one TV signal field period. To achieve this, the video signal is supplied to field stores whose contents are read out twice in succession to the display panel during one standard TV field period, while scanning the panel at twice the line rate of the applied TV signal. For a PAL TV display signal having a field period of 20 milliseconds and a 50 Hz field rate this means that the field period of the display panel is reduced to 10 milliseconds with the field rate in effect being converted to 100 Hz. The picture elements of the display panel 10 of the system embodiments of FIGS. 1 and 2 are to an extent driven in a manner which has some similarities. Referring again to FIGS. 1 and 2, the video signals from the input 25 are fed via an analogue to digital converter 27 and a change-over switch 28 into one of two digital field stores 30 and 31 which holds the digitised video signals for a complete TV field. The change-over switch 28 is operated by the circuit 21 such that alternate TV field signals are stored in the stores 30 and 31 respectively. While one store, e.g. store 30, is being loaded, the contents of the other store 31 are read out and supplied via a change-over switch 32, also controlled by the circuit 21, and a digital to analogue converter 33 to the video processing circuit 24. The stored signals in one store are read out line by line to the circuit 24, each line read-out taking half a TV line period. The row driver circuit 20 scans the row conductors at twice the conventional rate in synchronisation with the supply of data signals for a TV field. Thus, data for one TV field is loaded into the display panel in one half of the TV signal field period. After each row of picture elements has been loaded, a non-selection signal is applied to the respective row conductor to hold the TFTs of the row off, thus isolating the picture elements with the written display information stored therein. Thus far, the construction and manner of operation of the system embodiments of FIGS. 1 and 2 generally correspond. However the way in which they operate hereafter differs and the operation of the two embodiments will be described separately.

With regard to the system embodiment of FIG. 1, then following the writing of the display panel 10 with a display field in the above-described manner, the picture elements are left dormant and in the state to which they were driven, according to the applied data signals, for the remainder of the TV signal field period, that is, for approximately the latter half of this TV field period. This differs from the scheme described in EP-A-0487140 in which the picture elements are addressed again with the same display information in the second half of the TV field period. During this interval, no selection signals are supplied by the row driver circuit 20. Instead, the circuit 20 merely provides non-selection voltages to the row conductors to hold the TFTs 11 in their "off" state. In the system described in EP-A-0487140, the field store is operated to read out its contents a second time so that two successive, and identical, field read-outs are provided in one standard TV field period. The same scheme can be used here, although it will be appreciated that the second read-out from the store will have no effect on the contents of the picture elements as the picture elements are not selected during this second half of the TV field period.

At the end of the TV field period, the change-over switches 28 and 32 are operated so that the data signals for the next TV field are read out to the circuit 24 from the other store, again at twice the field rate of the TV signal and in synchronism with scanning of the row conductors at twice the conventional rate, while the next TV field is being loaded into the first store. In similar manner, after this next field has been loaded into the display panel, the picture elements are left unaddressed for the remaining latter half, approximately, of the TV field period. This operation is repeated continuously for successive TV fields.

Figure 3:
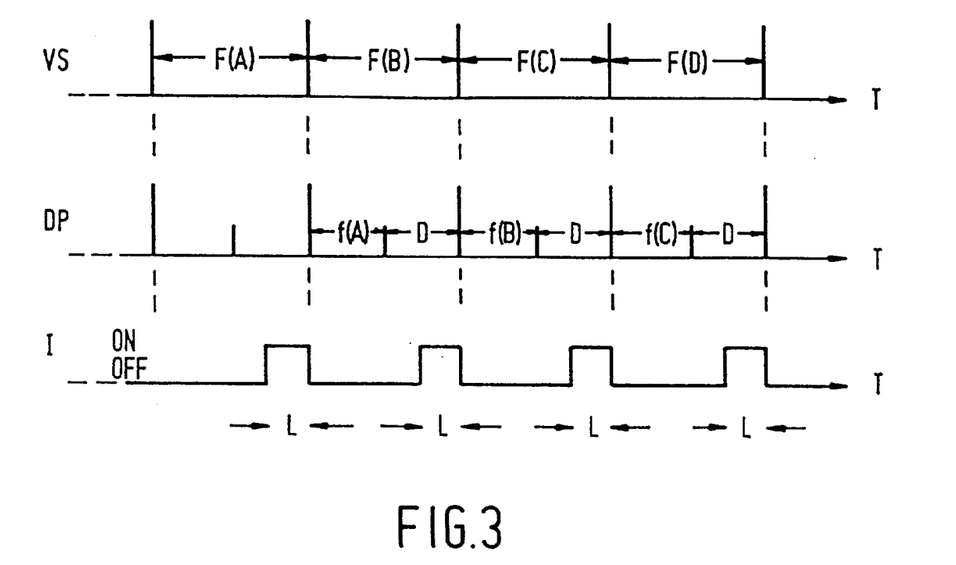
FIGS. 3 and 4 are timing diagrams illustrating examples of methods of operating the first and second embodiments of matrix display systems of FIG. 1 and FIG. 2 respectively according to the present invention.

The operation of the display panel 10 of the embodiment of FIG. 1 can be considered as occupying a succession of approximately equal periods of time each of which corresponds to approximately one half of field period of the applied TV signal, e.g. 10 ms, in which alternate periods constitute display panel field periods during which its picture elements are addressed by the driver circuits and loaded with display information for a respective TV field which is held for the intervening, non-address, periods. This manner of operation is depicted diagrammatically in FIG. 3 in which T represents time and F(A) to F(D) denote four successive field periods of the applied TV signal, VS. The relative timings of the operating periods of the display panel, DP, are illustrated in which f(A) to f(C) represent the display panel field periods, in which TV field information is written into the picture elements, and the periods D represent the dormant periods in which the picture elements of the panel are left unaddressed.

The illumination of the display panel 10 by the light source 19 is controlled selectively in timed relation to the operation of the panel. Thus, during the periods f(A), f(B) etc., the panel is not illuminated. Within the periods D, the panel is illuminated so that a visible display output, dependent on the information written in the picture elements in the immediately preceding panel display field f, is produced. The duration of this illumination is predetermined and can correspond to the length of the periods D. Preferably, however, the duration of illumination occupies a latter part only of the intervals. Thus, the light source is flashed on and off at regular intervals in synchronism with the periods D, as is indicated also in FIG. 3 in which I represents the illumination intensity over a period of time and L represents the illumination periods. In intervening periods, the light source is turned off so that no display output is obtained. To this end, and with reference to FIG. 1, the operation of the light source 19 is controlled by a switching circuit 23 to which appropriate timing signals are supplied from the timing and control unit 21. A succession of display outputs are thus presented to a viewer alternating with dark, pause, intervals. The duration of each of these pause intervals is substantially identical and corresponds to the time between successive periods of panel illumination which in the example illustrated in FIG. 3 comprises a display panel address period and an initial part of the interval. The display output obtained with this manner of operation of the display panel emulates the kind of stimuli presented to a viewer by a CRT display.

Turning now to the system embodiment of FIG. 2, then following the writing of data for one TV field into the display panel 10 in a display information address period comprising one half the TV signal field period as previously described, the picture elements of the array are addressed again in the interval comprising the remaining half of the TV signal field period to drive them to their substantially non-transmissive, black, state, unlike the scheme described in EP-A-0487140 in which the picture elements are addressed again with the same display information in the second half of the TV field period. To achieve this, selection signals are again supplied by the row driver circuit 20 to each of the row conductors in turn during this interval corresponding to the latter half of the TV field period with the selection signal of the first row conductor coinciding substantially with the beginning of the interval. For the duration of this period a predetermined reference voltage, $V_B$, is applied to each of the column conductors 16, which is selected such that the picture elements are driven to their substantially non-transmissive state. The reference voltage is applied by means of a switch circuit 35 connected between the outputs of the column driver current 22 and the set of column conductors which switches the column conductors between the column driver circuit's outputs and the reference voltage under the control of a switching signal S supplied by the circuit 21. The row conductors are scanned with a selection signal at the same rate as previously so that the rows of picture elements are set to their substantially non-transmissive states in sequence with the final rows being set close to the end of the interval. In one TV field period, therefore, there are two display panel address periods namely a display information address period in which the picture elements are driven to the required display states and a succeeding interval in which they are driven to their substantially non-transmissive states.

At the end of the TV field period, the change-over switches 28 and 32 are operated, and the switch circuit 35 reset, so that the data signals for the next TV field are read out to the circuit 24 from the other store, again at twice the field rate of the TV signal and in synchronism with scanning of the row conductors at twice the conventional rate and while the subsequent TV field is being loaded into the first store. After this next field has been loaded into the display panel, the picture elements are again driven to their substantially non-transmissive display states as before in the remaining latter half of the TV field period. This manner of operation is repeated for successive TV fields.

Thus, the operation of the display panel occupies a succession of approximately equal periods of time, each corresponding to approximately one half of the TV signal field period, e.g. 10 ms, in which alternate periods constitute first display panel field periods during which the picture elements are loaded with display information for a respective TV field and in which the intervening intervals constitute second display panel field periods during which the picture elements of the array are driven to their black state. This is depicted diagrammatically in FIG. 4 in which T represents time and F(A) to F(D) denote four successive field periods of the applied TV signal, VS. The relative timings of the operating periods of the display panel, DP, are illustrated in which f(A) to f(C) represent the first display panel field (display information address) periods, and the periods f' represent the intervals therebetween constituting the second display panel address periods.

Figure 4:
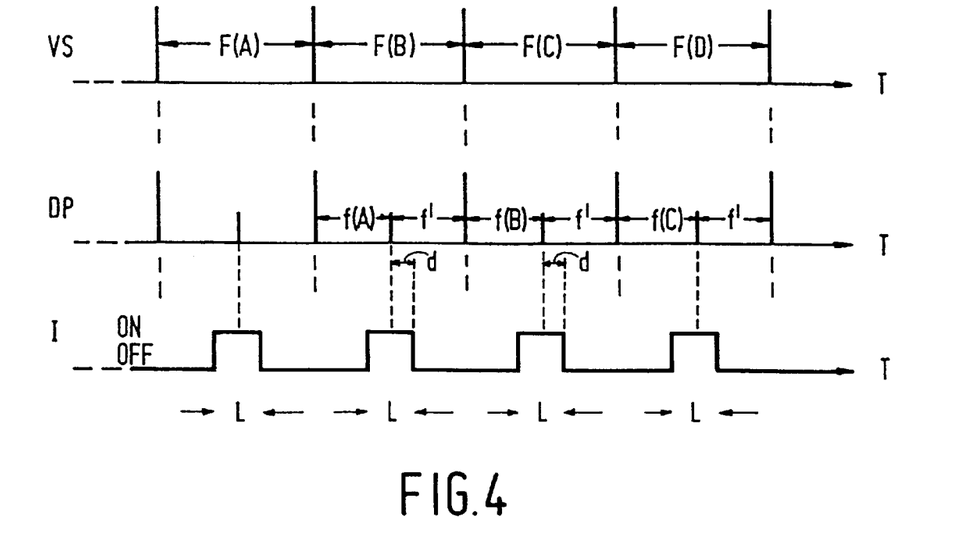

In this particular embodiment, the illumination of the display panel 10 by the light source 10 is controlled selectively in timed relation to the operation of the panel such that the panel is not illuminated at predetermined times. More particularly, the illumination means is switched off for a latter part of the intervals (f') and an initial part of the succeeding display information address period (for example f(B)). The panel is thus illuminated for a predetermined latter part of the first display information address period, e.g.

f(A), and an initial part of the following interval. The illumination of the panel produces a visible display output dependent on the then subsisting display states of the picture elements. This selective illumination is achieved by flashing on and off the light source of the illumination means at regular intervals in synchronism with the periods f' and f(A), f(B), etc., as is also indicated in FIG. 4 in which I represents the illumination intensity over a period of time and L represents the illumination periods. For the first part of each period L picture elements in the lower part of the panel are being addressed with display information while during a latter part of the period L picture elements in the upper part of the panel are being set to the "black" state. Illumination during an initial part of the period f' is required bearing in mind that the lower rows of picture elements are set to their display states towards the end of the period f(A), f(B), etc.

With reference to FIG. 2, the operation of the light source 19 is controlled by a switching circuit 23 to which appropriate timing signals are supplied from the unit 21.

A succession of display outputs is thus presented to a viewer alternating with dark, or pause, intervals, the duration of these intervals being substantially identical and corresponding to the time between successive periods of panel illumination. The display output thus obtained emulates the kind of stimuli presented to a viewer by a CRT display.

Consideration will now be given to the manner in which display information is presented and a viewer's perception of moving images generated by the display panel in the embodiments of display system in both FIG. 1 and FIG. 2. Motion is spatial position variation with time and in the natural world this time is continuous. In the various display technologies available for communicating moving image data, for example LC displays and CRTs, some form of quantisation is performed in the image transfer process. Because the temporal dimension of a moving image is quantised, continuous movement does not exist and instead a sequence of images which present the spatial position of moving objects at various points in time is obtained. This kind of motion, so-called apparent motion, can be perceived by observers as true motion subject to certain constraints. Of the various types of apparent motion produced by successive representations of images shifted in time, so-called Beta movement, that is, the apparent spatial movement, is of most relevance with regard to perceived blurring in a display image. It has been determined that, inter alia, the duration of pause intervals between successive presentations is an important parameter in the perception of movement.

In a CRT display the duration of light emission from a pixel in response to excitation by the scanning electron beam is generally less than 2 milliseconds and the frequency of excitation is 50 Hz, i.e. every 20 milliseconds, for a PAL display. Thus a significant pause interval exists between successive stimuli, and for this reason motion is perceived very effectively. In contrast, the picture elements of conventionally driven active matrix addressed LC display panels hold and display the picture information for the complete (field) period until they are next addressed. Consequently there is substantially no pause interval between successive presentations of picture information. This difference is believed to be the cause of a speed dependent residual blur in conventional LC displays compared with CRT displays. An abrupt change in the spatial position of moving objects occurs when the picture elements are re-addressed. The eye of a viewer is presented with a new spatial position for the moving object while it is still focussed at the old position. The viewer's eye then shifts to the new position, and while this is happening the object is being displayed all the time. This results in movement of the image on the retina while the eye is tracking the movement. In the CRT display on the other hand the eye can shift to a new, anticipated, position of a moving object in the pause interval between successive presentations and no excitation of the eye exists during the pause interval. This means, in effect, that the flashing moving image will be received on the same part of the retina. The differences in the characteristics of display are illustrated diagrammatically in FIGS. 5(A) and 5(B) which show respectively the temporal behaviour of a CRT and a conventionally-driven active matrix LC display panel in comparison with the situation for the real world, FIG. 5(C), when viewing the same moving object. In these diagrams T and P represent time and position and F and M are respectively the field period (20 milliseconds for a PAL display) and the movement from one field to the next.

Figure 5A:
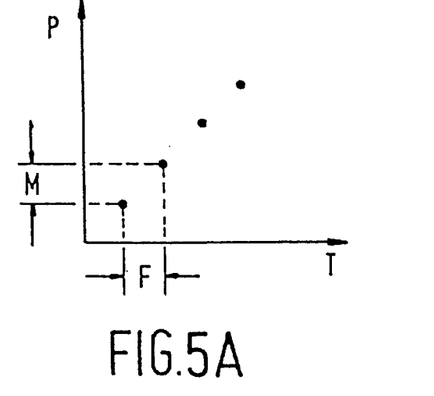
FIGS. 5(A) to 5(D) illustrate for comparison the temporal behaviour of respectively a CRT display, a conventionally-driven matrix LC display system, the real word, and matrix LC display systems according to the present invention when viewing a moving object.
Figure 5B:
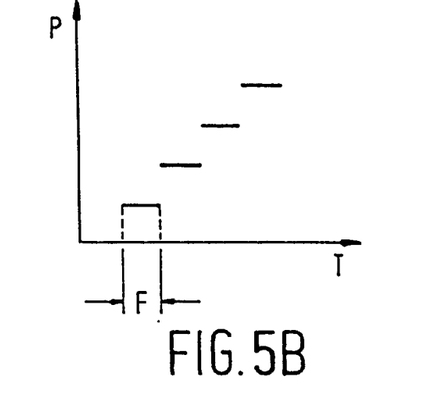
Figure 5C:
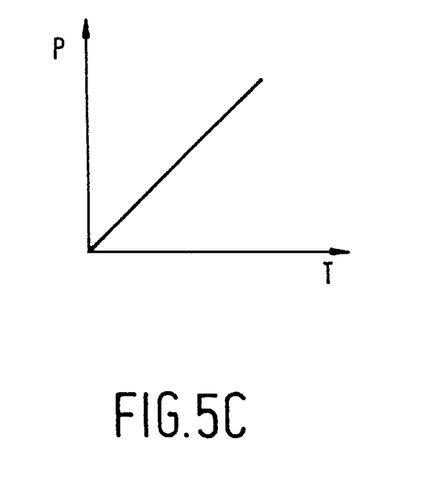

With regard to FIG. 5(A), it is seen that a CRT presents to a viewer discrete light outputs, denoted here by dots representing the moving object, which are separated in time and position. In a conventionally driven active matrix display, FIG. 5(B), the light output is held for a field period, as indicated by a solid line. At the end of each field, the output jumps immediately to a new position.

Figure 5D:
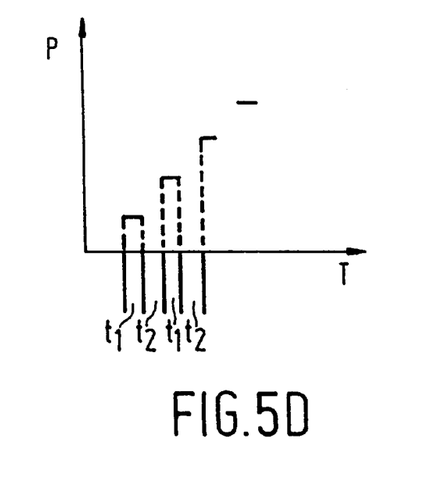

FIG. 5(D) illustrates the temporal behaviour of the outputs of the display panels 10 of the systems of FIGS. 1 and 2 driven in the above-described manners. Compared with FIG. 5(B), it is seen that the display output, representing the moving object, is held for up to only half the time, i.e. $t_1$ is less than or equal to F/2, and that there is an interval $t_2$ between successive display outputs where $t_2$ is greater than or equal to F/2. Thus, the output more closely resembles, and deviates less from, the real world case of FIG. 5(C) than that of a conventionally driven display panel and approaches that obtained from a CRT display. As a result the perceived blur when viewing a moving object is significantly reduced compared with that found in a conventionally driven active matrix LC display panel.

Various modifications are possible to the two system embodiments described above.

With regard to the display system embodiment of FIG. 1, the length of time for which the light source is flashed on can be varied. It could occupy the length of the dormant, non-address, periods in operation of the panel. Preferably, the pulse of light occupies a latter part of the dormant period so as to allow the most time for the transmissions of picture elements to settle to their required level after address and before the display output is produced. The lamp flash could possibly continue for an initial part of the subsequent address period. The major part of the lamp flash should however occur in the interval. Shorter duration flashes would emulate more closely the behaviour of a CRT display. However, the duration the flash determines in part the total light output from the display panel and therefore is selected having regard to the brightness of the light source employed to optimise display quality in this respect. Conversely, however, compensation can be achieved by using a lamp whose brightness is suitably selected having regard to the duration of the flashes.

The relative durations of the display panel address and dormant, non-address, periods (f and D respectively in FIG. 3) can also be varied to an extent. As described above, each of these periods corresponds to approximately half the field period (F) of the TV signal. However, the panel address periods (f) and dormant periods (D) could for example be one third and two thirds respectively of the TV field period or vice versa.

In a further modification, the display panel may be addressed in a similar manner to that described in EP-A-0487140 with the picture elements being loaded twice, with identical information, during each TV signal field period by reading out the contents of the field stores 30 and 31 twice in succession, the second readout taking place in the second half of a TV signal field period corresponding to the dormant period D in the above described embodiment. For this, selection signals are again applied by the row driver circuit 20 to successive row conductors 14 in the latter half of the TV field period.

With regard to the display system embodiment of FIG. 2, then again the length of time for which the light source is flashed on to illuminate the panel can be varied. In the example illustrated in FIG. 4, the illumination flashes L occupy approximately one third the periods f(A), f(B), etc., and approximately one quarter of the periods f'. The duration of the flashes could be increased to occupy more of, and possibly all of, the periods f(A), f(B), etc., and also perhaps more of the periods f' although shorter duration flashes would emulate more closely the behaviour of a CRT display. The duration of the flash determines the total light output from the display panel and therefore is preferably selected having regard to the brightness of the light source employed to optimise display quality in this respect. Conversely, the brightness of the lamp can be selected having regard to the duration of the flashes.

It may not always be necessary to restrict illumination of the panel to certain time periods. The driving of the picture elements to the black state in the intervals between the display information address periods introduces the required pause intervals and could be sufficient by itself. In this case, the light source can be arranged to illuminate the panel continuously.

The relative durations of the display panel first and second address periods (f and f' respectively in FIG. 4) can also be varied to an extent. As described above, each of these periods corresponds to approximately half the field period (F) of the TV signal. However, the panel address periods f and f' could be different, for example one third and two thirds respectively of the TV field period or vice versa, although this would complicate driving.

In the particular embodiment described, the rows of picture elements are set to their non-transmissive states in the intervals by scanning the rows in turn with the setting of the first and last row coinciding approximately with beginning and end of interval respectively. However, other schemes for driving the picture elements to this state could be used. For example the rows could be set in a sequence of groups of successive rows or possibly substantially all together rather than in a sequence. These latter schemes would entail modification to the row drive circuit 20 however.

Moreover, the driving of the picture elements to their non-transmissive states need not commence at the beginning of the interval. Instead, a short predetermined delay time, as shown at d in FIG. 4, may be introduced at the beginning of the intervals before the picture elements are set to this required state. This delay time would constitute a dormant period which follows after all the picture elements have been set to their display state in the period f(A), f(B), etc., during which the panel is illuminated. The end of this delay time d may be chosen to coincide with the end of the illumination period, as indicated by the dashed line in FIG. 4, with the picture elements to this state in the remaining part of the interval will require a faster scanning rate which can be achieved by operating the row drive circuit at a higher clocking speed.

With regard to both embodiments, techniques other than switching the light source on and off could be employed. For example, the light source could be energised continuously and an LC shutter interposed between the light source and display panel to modulate the light. This approach would, however, be less energy efficient. The light source could perhaps instead be switched between high and low output levels rather than switched on and off, the low level being such that substantially no display output is visible.

The display systems may be projection systems in which high intensity projection lamp is used as the light source.

Although described in relation to a display system using an active matrix LC panel, the invention can also be applied with similar advantageous effects in display systems using a passive LC display panel or other kinds of light modulating, time persistent, display panels, such as electrochromic and electrophoretic type panels. Moreover the display system could be a colour display system in which the display panel further includes colour filter elements in an array aligned with the picture elements electrodes in known manner. In this case references to black and white display states should be construed accordingly.

From reading the present disclosure, other modifications will be apparent to persons skilled in the art. Such modifications may involve other features which are already known in the field of LC display systems and which may be used instead of or in addition to features already described herein.

We claim:

1. A video display system comprising a matrix display panel having a row and column array of picture elements for modulating light which are drivable to at least substantially transmissive and substantially non-transmissive states, a light source for illuminating the display panel to produce a display output, and drive means for driving the picture elements according to a video signal, the video signal divided into successive fields of display information, and each field divided into successive lines of display information, the video signal also having a given field and line rate applied to the drive means, the drive means being operable to address the rows of picture elements sequentially at least once during successive display address periods such that the display information of each successive display field of the applied video signal is written into the display panel in a display information address period, characterised in that the display information of each display field of the applied video signal is written into the display panel in substantially less than a display information address period, and during the remainder of the display address period substantially no display output is produced, whereby dark intervals are introduced between the presentation to a viewer of successive display fields of the panel, which leads to an improvement in the perceived sharpness of moving images in the display.

2. A matrix display system according to claim 1, characterised in that the drive means include a control circuit for the illuminating means which is arranged to control light output from the illuminating means in relation to the driving of the picture elements such that a display output is produced from the display panel for at least a part of the time interval and substantially no display output is produced during at least a part of the display information address period.

3. A matrix display system according to claim 2, characterised in that the illuminating means is controlled by the control circuit to illuminate the panel only during said time intervals.

4. A matrix display system according to claim 2, characterised in that the illuminating means is controlled by the control circuit to illuminate the display panel during a latter part only of said time intervals.

5. A matrix display system according to claim 2, characterised in that the drive means are operable to drive the picture elements again during the interval following a respective display information address period to write into the array of picture elements the same display information as written into the display panel during said respective display information address period.

6. A matrix display system according to claim 3, characterised in that the illuminating means is controlled by the control circuit to illuminate the display panel during a latter part only of said time intervals.

7. A matrix display system according to claim 3, characterised in that the drive means are operable to drive the picture elements again during the interval following a respective display information address period to write into the array of picture elements the same display information as written into the display panel during said respective display information address period.

8. A matrix display system according to claim 4, characterised in that the drive means are operable to drive the picture elements again during the interval following a respective display information address period to write into the array of picture elements the same display information as written into the display panel during said respective display information address period.

9. A matrix display system according to claim 1, characterized in that the drive means are operable to drive the picture elements of the array to their substantially non-transmission display states in the intervals between successive display information address periods.

10. A matrix display system according to claim 9, characterised in that the drive means is operable to drive the rows of picture elements in sequence to their substantially non-transmissive display states during the interval and with the driving of the first row of picture elements of the array coinciding substantially with the beginning of the interval.

11. A matrix display system according to claim 9, characterised in that the illuminating means is arranged to illuminate the display panel continuously during operation.

12. A matrix display system according to claim 9, characterised in that the drive means include a control circuit connected to the illuminating means which switches the illuminating means off or to a comparatively low light output level for a part of said intervals.

13. A matrix display system according to claim 12, characterised in that the drive means is operable to drive the rows of picture elements in sequence to their substantially non-transmissive display states during the interval and with the driving of the first row of picture elements commencing a predetermined time delay after the beginning of the interval, and in that the illumination means is operable by the control circuit to illuminate the display panel during said delay.

14. A matrix display system according to claim 12, characterised in that the drive means is operable to drive the rows of picture elements in sequence to their substantially non-transmissive display states during the interval and with the driving of the first row of picture elements of the array coinciding substantially with the beginning of the interval.

15. A matrix display system according to claim 12, characterised in that the control circuit switches the illuminating means off, or to a comparatively low light output level, for a period comprising a latter part of the interval and an initial part of the following display information address period.

16. A matrix display system according to claim 15, characterised in that the drive means is operable to drive the rows of picture elements in sequence to their substantially non-transmissive display states during the interval and with the driving of the first row of picture elements commencing a predetermined time delay after the beginning of the interval, and in that the illumination means is operable by the control circuit to illuminate the display panel during said delay.

17. A matrix display system according to claim 15, characterised in that the drive means is operable to drive the rows of picture elements in sequence to their substantially non-transmissive display states during the interval and with the driving of the first row of picture elements of the array coinciding substantially with the beginning of the interval.

18. A matrix display system according to claim 1, characterised in that the duration of a display information address period and a succeeding time interval combined corresponds to a field period of an applied video signal.

19. A matrix display system according to claim 18, characterised in that the duration of a display information address period and the duration of an interval are each approximately equal to one half of a field period of an applied video signal.

20. A matrix display system according to claim 1, characterised in that the display panel comprises an active matrix addressed display panel in which each of the picture elements is driven via a respective switching device.

21. A matrix display system according to claim 1, characterised in that the picture elements comprise liquid crystal picture elements.

22. A method of operating a video display system comprising a matrix display panel having a row and column array of picture elements for modulating light which are drivable to at least substantially transmissive and substantially non-transmissive states, a light source for illuminating the display panel to produce a display output, and drive means for driving the picture elements according to a video signal, the video signal divided into successive fields of display information, and each field divided into successive lines of display information, the video signal also having a given field and line rate applied to the drive means, in which the rows of picture elements are sequentially addressed at least once during successive display address periods such that the display information of each successive display field of the applied video signal is written into the display panel in a display information address period, characterised in that the display information of each display field of the applied video signal is written into the display panel in substantially less than a display information address period, and during the remainder of the display address period substantially no display output is produced, whereby dark intervals are introduced between the presentation to a viewer of successive display fields of the panel, which leads to an improvement in the perceived sharpness of moving images in the display.

23. A method according to claim 22, characterised in that the illumination of the display panel by the illumination means is controlled such that a display output is produced during at least a part of said time interval and such that substantially no display output is produced during at least a part of a said address period.

24. A method according to claim 23, characterised in that the display panel is illuminated only during said time intervals.

25. A method according to claim 23, characterised in that the display panel is illuminated during a latter part only of said time intervals.

26. A method according to any one of claim 23, characterised in that the display information written into the array of picture elements during a respective display information address period is again written into the array of picture elements during the time interval following that address period.

27. A method according to claim 1, characterised in that the illuminating means is switched off, or to a comparatively low light output level, for a part of the interval.

28. A method according to claim 27, characterised in that the illuminating means is switched off, or to a comparatively low light output level, for a period comprising a latter part of the interval and an initial part of the following display information address period.

29. A method according to claim 22, characterized in that the picture elements of the array are driven to their substantially non-transmissive display states in the interval between successive display information address periods.

30. A method according to claim 29, characterised in that the duration of a display information address period together with a time interval corresponds to a field period of an applied video signal.

31. A method according to claim 30, characterised in that the durations of an address period and an interval are each approximately one half of a field period of an applied video signal.

* * * * *